US011510006B2

(12) United States Patent
Nyimpha

(10) Patent No.: US 11,510,006 B2
(45) Date of Patent: Nov. 22, 2022

(54) INTEGRATED HEADSET COMMUNICATIONS SYSTEMS

(71) Applicant: Ike Nyimpha, Bowie, MD (US)

(72) Inventor: Ike Nyimpha, Bowie, MD (US)

( * ) Notice: Subject to any disclaimer, the term of this patent is extended or adjusted under 35 U.S.C. 154(b) by 0 days.

(21) Appl. No.: 17/389,426

(22) Filed: Jul. 30, 2021

(65) Prior Publication Data
US 2022/0095053 A1    Mar. 24, 2022

Related U.S. Application Data

(60) Provisional application No. 63/081,370, filed on Sep. 22, 2020.

(51) Int. Cl.
| | |
|---|---|
| *H04R 5/02* | (2006.01) |
| *H04R 5/033* | (2006.01) |
| *H04R 3/04* | (2006.01) |
| *H04R 1/10* | (2006.01) |
| *H04W 4/80* | (2018.01) |
| *H04R 1/00* | (2006.01) |

(52) U.S. Cl.
CPC ........... *H04R 5/033* (2013.01); *H04R 1/1008* (2013.01); *H04R 1/1025* (2013.01); *H04R 1/1041* (2013.01); *H04R 3/04* (2013.01); *H04W 4/80* (2018.02); *H04R 2420/07* (2013.01); *H04R 2430/01* (2013.01)

(58) Field of Classification Search
CPC .... H04R 5/033; H04R 1/1008; H04R 1/1025; H04R 1/1041; H04R 3/04; H04R 2420/07; H04R 2430/01; H04W 4/80

USPC .................................................. 381/74, 309
See application file for complete search history.

(56) References Cited

U.S. PATENT DOCUMENTS

| | | | | |
|---|---|---|---|---|
| 11,368,775 | B1 * | 6/2022 | Prelogar | H04R 1/1041 |
| 2015/0071456 | A1 * | 3/2015 | Steenkamp | H04R 1/1091 381/74 |
| 2017/0180862 | A1 * | 6/2017 | Strasberg | H04R 1/1025 |
| 2018/0270565 | A1 * | 9/2018 | Ganeshkumar | G10L 25/84 |
| 2021/0084401 | A1 * | 3/2021 | Smiechowski | H04R 1/1041 |

* cited by examiner

*Primary Examiner* — Ammar T Hamid

(57) ABSTRACT

An integrated headset communications system is presented. The system includes a curved headband. The system also includes a left-hand side headphone. The system further includes a right-hand side headphone. The system includes external speakers on right-hand side and left-hand side headphones. The system also includes internal speakers on right-hand side and left-hand side headphones. The system further includes two detachable rechargeable battery packs. The system includes a background noise cancellation mechanism. The system also includes a plurality of proximity sensors positioned on the system. The system further includes an automatic volume control safety module. The system includes a plurality of photocells positioned externally on the curved headband. The system also includes a plurality of flashlights and flashing lights positioned externally on the curved headband. The system also includes a data processor. The system further includes a removable system remote controller.

15 Claims, 7 Drawing Sheets

INTEGRATED HEADSET COMMUNICATIONS SYSTEMS

FIELD OF THE INVENTION

The present invention relates generally to headset systems, and more particularly, to integrated headset communication systems which provide a user the ability to automatically and manually transmit communication signals, control audio transmissions, and provide an integrated system wherein various sources of electrical power can be utilized.

BACKGROUND OF THE INVENTION

Many methods and systems have been used in unsuccessful attempts to provide an integrated headset communications platform which can simultaneously carry out a plurality of communication transmission and receiving functions. These systems and methods have not been reliable or effective. Many of the unsuccessful systems are cumbersome, costly and fail to provide all of the necessary alerts and communications capabilities on a singular platform.

As the world's population increases and the desire to walk through parks and outdoor areas increases, so does the need for a singular device wherein a user can be outside and can be provided with communications and entertainment capabilities.

Additionally, past attempts have failed to provide a singular device for a user to use in any environment to hear music, communicate with others, and provide an interactive platform while walking or jogging outdoors. Many of these unsuccessful attempts were costly and cumbersome for a user.

Accordingly, there is an established need for an integrated headset system which solves at least one of the aforementioned problems. Further, there is an established need for integrated headset communications systems which can address providing all communication needs on one platform.

SUMMARY OF THE INVENTION

According to an aspect of the present invention, integrated headset communications systems are provided. These innovations include new, useful, and non-obvious systems which provide a user of the system simultaneous communications capabilities and safety alert mechanisms.

According to another aspect of the present invention, the system can include a plurality of memory card slots. The card slots configured to receive memory cards with audio, video, and/or other data for use by system users.

According to yet another aspect of the present invention, an integrated headset communications system is presented. The system includes a curved headband. The system also includes a left-hand side headphone connected to an end of the curved headband with a swivelable and foldable pivot point. The system further includes a right-hand side headphone connected to another end of the curved headband with another swivelable and foldable pivot point. The system includes external speakers on right-hand side and left-hand side headphones. The system also includes internal speakers on right-hand side and left-hand side headphones. The system further includes two detachable rechargeable battery packs positioned externally on a left-hand side and right-hand side lower portions of the curved headband and configured to power the system on one battery pack while the other battery pack has depleted or is detached from the system. The system includes a background noise cancellation mechanism attached to the system. The system also includes a plurality of proximity sensors positioned on the system and configured to detect when the headset communications system is placed onto a user's ears and when the system is removed from the user's ears. The system further includes an automatic volume control safety module configured to automatically modulate the internal speakers' volume when the plurality of proximity sensors detect the system is placed onto the user's ears and designed to prevent excessive volume of the internal speakers when the system is placed on the user's ears and structured to provide a safety mechanism to prevent inadvertent damage to the user's ears and arranged to prevent chronic hearing loss to system users. The system includes a plurality of photocells positioned externally on the curved headband. The system also includes a plurality of flashlights and flashing lights positioned externally on the curved headband and externally on the left-hand side and right-hand side headphones and configured to automatically illuminate when the plurality of photocells detect low visibility or onset of darkness conditions. The system also includes a data processor. The system further includes a removable system remote controller.

In embodiments, the system can include an on and off control mechanism configured to turn the background noise cancellation mechanism on or off.

In embodiments, the system can include an on and off mechanism configured to turn the automatic volume control safety module on or off.

In embodiments, the system can include an on and off mechanism configured to turn the plurality of flashlights and flashing lights on or off.

In embodiments, the system can include a system alert which annunciates when the battery pack's remaining charge is below 10% and is due to be removed and externally recharged.

In embodiments, the system can include biometric sensors positioned on an interior of the curved headband and configured to provide a system user real time biometric data such as heart rate.

In embodiments, the system can include photoluminescent strips positioned on external portions of the curved headband and the right-hand side and left-hand side headphones.

In embodiments, the system can include reflective strips positioned on external portions of the curved headband and the right-hand side and left-hand side headphones.

In embodiments, the system can include a wireless data receiver and transmitter.

In embodiments, the system can include a GPS location identification device.

In embodiments, the system can include a transmitting module capable of transmitting biometric and medical data to local emergency medical services upon an indication of a medical emergency wherein the medical data includes pre-existing medical conditions.

In embodiments, the system can include a visual visor.

In embodiments, the system can include a remote controller which includes a snap-on/snap-off attachment mechanism.

In embodiments, the system can include solar panels positioned externally on the curved headband.

In embodiments, the system can include providing audible books, audio playlists, and preferred video data for the system user to configure and utilize.

In embodiments, the system can include biometric sensing capabilities. The biometric sensing capabilities configured to provide system users real time information such as but not limited to heart rate and physical exertion levels and can provide automatic alerts if the sensing indicates an imminent life threatening condition such as a cardiac arrest.

In embodiments, the system can include reflective and photoluminescent strips on an exterior of the headset system such that adjacent vehicular traffic will be able to see the system user and avoid an accident, even in low visibility conditions.

In embodiments, the system can include flashing lights, which can be manually and automatically initiated upon photocells sensing a low visibility or onset of darkness conditions. The flashing lights arranged on the exterior of the system to alert others in the vicinity of the user of their presence.

In embodiments, the system can include capabilities of activation of flashlights located on the exterior of the headset system to illuminate manually or automatically upon sensing of a low visibility condition or onset of darkness. The flashlights structured and arranged on the headset to provide illumination of walking or running path of the system user.

In embodiments, the system can be configurable to allow individual users to personalize their own individual settings such as but not limited to visual equalizer settings, audible book selections, playlist selections, external system interfaces, biasing of right hand side and left hand side headphones and external speakers.

In embodiments, the system can include a microprocessor. The microprocessor configured to control data streams, interface with a mobile application, interact with other headset systems which may be adjacent to the user, or other systems which are coupled to the system user. For example, the system user may be able to interact with an adjacent jogger who has another headset system on.

In embodiments, the system can be arranged to provide loudspeaker functionality allowing a system users voice or other audio transmissions to be output from external speakers.

In embodiments, the system can include augmented power supply capability to allow louder external speaker volumes.

In embodiments, the system can include manual and automatic visual equalizer annunciation mechanisms.

In embodiments, the system can provide for wired and wireless transmissions simultaneously to external speakers and other coupled devices.

In embodiments, the system can include a headset with includes internal headphones and external speakers configured to communicate with other Wi-Fi, Bluetooth, and personal area networks (PAN) enabled devices. The system can also include a microphone for system user to transmit voice signals, commands, and data streams.

In embodiments, the system can include capabilities such as responding to and initiating telephone calls while simultaneously broadcasting same or other transmissions on external speakers.

In embodiments, the system can simultaneously communicate with a plurality of coupled but distantly located speakers and devices and maintain capability of controlling data communication between the system and devices.

In embodiments, the system can discern, and control independently right-hand side and left-hand side internal headphone and external speaker transmissions. For example, the system user can engage in two separate telecommunications one on the right-hand side and another on the left-hand side of the internal headphones. Further, the system user can transmit different outputs on left hand side and right-hand side external speakers.

In embodiments, the system can include remote control circuitry capability. The remote-control capability can be accomplished with a remote controller. The remote controller can be attached to the headset and can be separate from the headset. Further, the remote controller can be a detachable mechanism which can be affixed or detached from the headset as a system user desires.

In embodiments, the remote controller can include automatic control functionality enabling and disabling certain control functions depending on whether the remote controller is affixed or detached from the headset. These control functions can include but are not limited to volume control, equalizer, playlist choices, audio book choices, video, audio, and transmission device connection choices.

In embodiments, the remote controller can include a magnetic back which utilizes magnetic attraction to secure the remote controller to the headset. The remote controller can also utilize a Snap-On and snap-off mechanism to assist in securing the remote controller to the headset.

In embodiments, the system can include external speakers preferentially located on the exterior of left-hand side and right-hand side of the headset. Also, the system can include internal headphones preferentially located on the left-hand side and right-hand side of the headset. The system can also include coupling with a plurality of other systems and all of the other systems and can be independently engaged with telephone conversations and other data transmission streams.

In embodiments, the system can include visual goggles or visor which can display audio and visual transmission choices and control can be accomplished with virtual hand movement or retinal tracking and engagement with blinking movement.

In embodiments, the system can include allowing the system user to share music, audible books, video streams, and other data streams with other coupled headset system users and other coupled devices.

In embodiments, the system can include solar panels. The solar panels can be structured to be stationary non-movable and affixed to the exterior the headset system. The solar panels can also be retractable such that they can fold up and stowed within the headset system when not deployed. The solar panels can be sized such that when deployed the energy generation capability can provide ample system charging in a relatively short period of time.

In embodiments, the system can include right hand side and left-hand side battery packs. The battery packs can be interchangeable and standardized in that any battery pack can be used in either location and can utilize a common charging station. The battery packs can be charged by physically removing them from the headset and placing them in a stand-alone charger. Further, the system can include in-place charging of the battery packs while installed with an externally connected charger or directly and indirectly with solar panels.

In embodiments, the battery packs can be quick release battery packs and they can be arranged such that only one battery pack is utilized by the system while the other battery pack remains as a backup.

In embodiments, the system can include audible and visual alerts of remaining battery charge and the need for replacing or recharging a battery pack.

In embodiments, the system can include a background noise cancellation module with dual noise-detecting microphones configured to pick up and filter out background noise.

In embodiments, the system can include GPS location components allowing the system to interact with other communications platforms wirelessly to indicate location. Further, the system can include manual and automatic capabilities to alert other communication platforms of physical location upon an imminent physical danger or an imminent biological condition such as an impending cardiac arrest.

In embodiments, the system can include a manually operated panic button. The panic button situated within the headset to prevent inadvertent activation.

In embodiments, the system can include a thin headset with external speakers on the exterior of both the right and left-hand side ear pads. It can be worn around the ears and allow listening to music with earbuds connected to the ear pads. The system can include backup batteries which can be removed from the headset for charging. The system has a flat removable remote control which can connect to external speakers with Bluetooth. The headsets left and right-hand side ear cups are attached by a band placed over head. The product has an oval shaped piece of plastic that allows control of integrally attached lighting to coordinate with music.

In embodiments, the system can control the volume of the headset such that it increases when the 2 oval shapes are attached to one another. The volume decreases when placed over your head. This is to protect the hair cells in the cochlea from being bent too much or damaged.

In embodiments, the system also includes flashing lights, which can be manually or automatically initiated upon photocells sensing a low visibility or onset of darkness conditions. The flashing lights arranged on the exterior of the system are configured to alert others in the vicinity of the user's presence.

In embodiments, the system can provide safety features such that to prevent headset or earbuds at moderate volume can damage earing overtime. Earbuds put audio signals close to the inner ear boasting as much as 9 decibels, over 85 decibels can cause hearing damage. The Headset has memory 32 GB/64 GB for music streaming so one can listen to music selection.

These and other objects, features, and advantages of the present invention will become more readily apparent from the attached drawings and the detailed description of the preferred embodiments, which follow.

BRIEF DESCRIPTION OF THE DRAWINGS

The features and advantages of the present invention will be better understood when the Detailed Description of the Preferred Embodiments given below is considered in conjunction with the figures provided.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
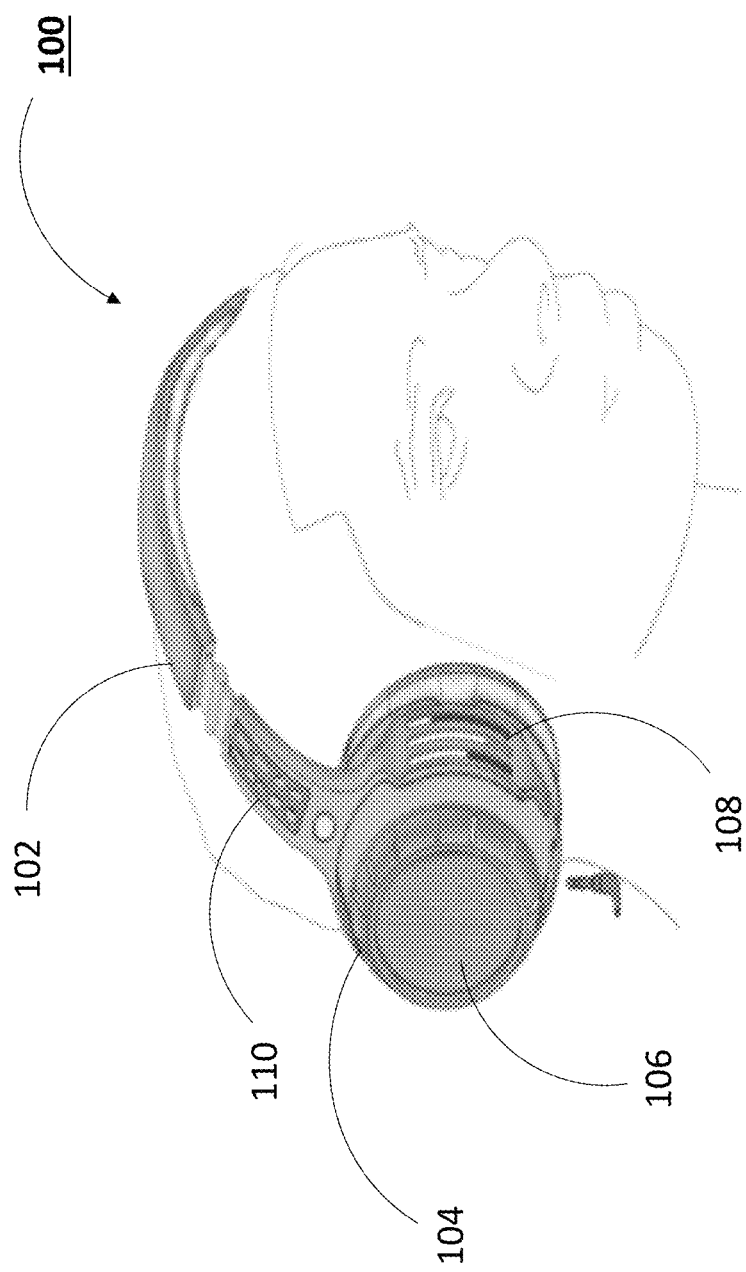
FIG. 1 is a perspective view of an embodiment of the present invention being worn by a user.

As seen in FIG. 1, embodiments of the present invention can be configured to be used as wearable headsets. The headsets can be arranged to provide a user a plurality of listening options, communications options, and a plurality of electrical power options. As can be seen in FIG. 1, the system 100 can include external speakers 106 on the headset. Further, the system can include control features integral to the headset and in embodiments not shown, a remote controller 110 can be detachable from the headset and operable as a stand-alone controller. Also as shown, the system 100 can include visual equalizer indicator and annunciation mechanisms and flashlights. The system 100 includes a curved headband 102 connected to a right-hand side headphone 104. The headphone 104 can include external speakers 106. Further, the system can include a remote controller 110.

Figure 2:
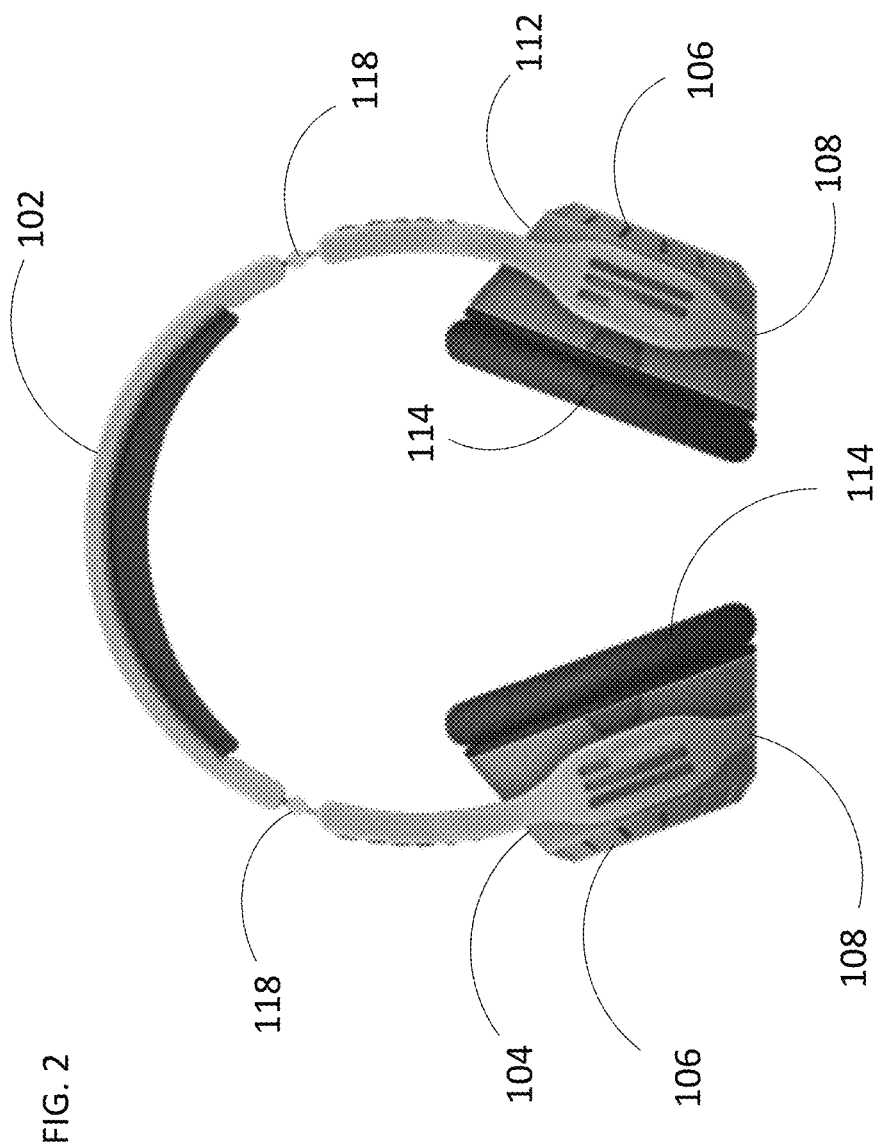
FIG. 2 is a front view of an embodiment of an integrated headset communications system.

FIG. 2 displays a back and/or front view of an embodiment of the system 100 showing a right-hand and left-hand side of the headset with right-hand and left-hand side headphones 104 and 112. The headset can include form fitting external noise cancellation material and devices to allow the system user to listen to selected audio selections without interference.

Figure 3:
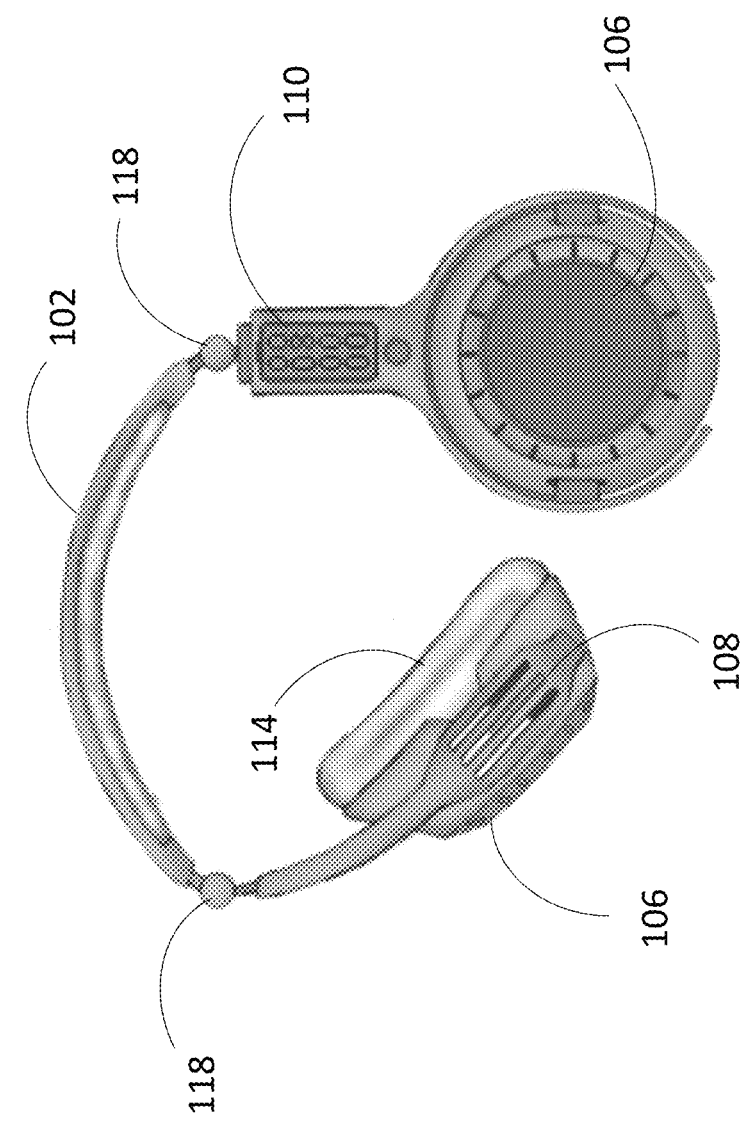
FIG. 3 is a side view showing a swivel feature of an embodiment of the present invention.

As best seen in FIG. 3, the system can include swivel features 118 allowing the left-hand side and right-hand side earpieces to rotate about an axis to provide audio data streams to be heard in a plurality of directions. The system can include annunciation lights and flashlights 108, external speakers 106, internal speakers 114 and a remote controller 110.

Figure 4:
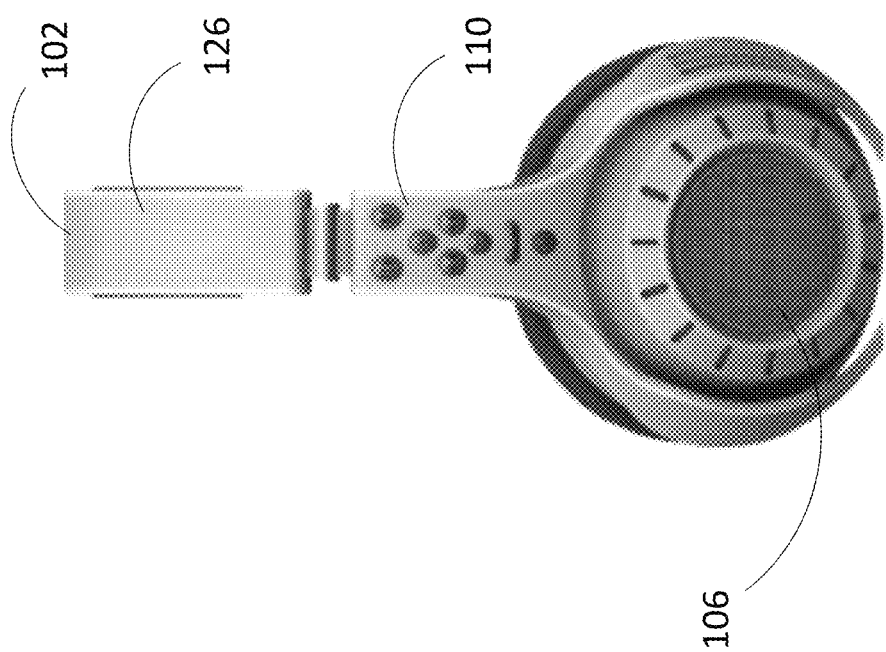
FIG. 4 is a side view of an embodiment of an integrated headset communications system.

FIG. 4 shows a side view of the system 110. The system can include a remote controller 110, a curved headband, photoluminescent and reflective strips 126.

Figure 5:
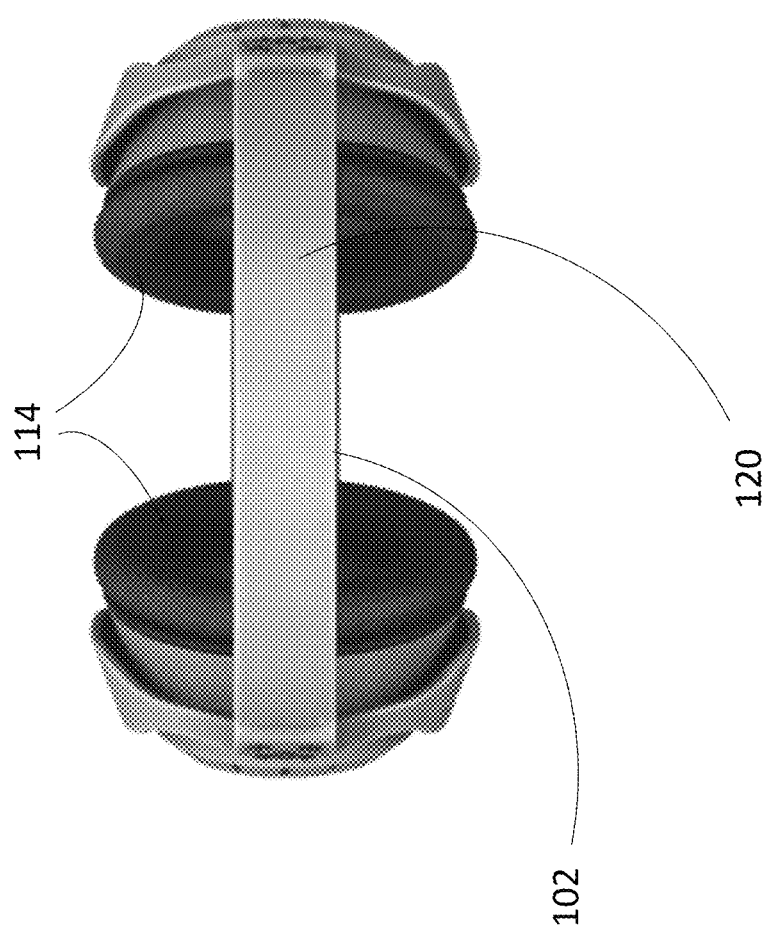
FIG. 5 is a top view of an embodiment of the present invention.

FIG. 5 shows a top view of the system 100. The system can include solar panels 120 on an exterior of the curved headband 102.

Figure 6:
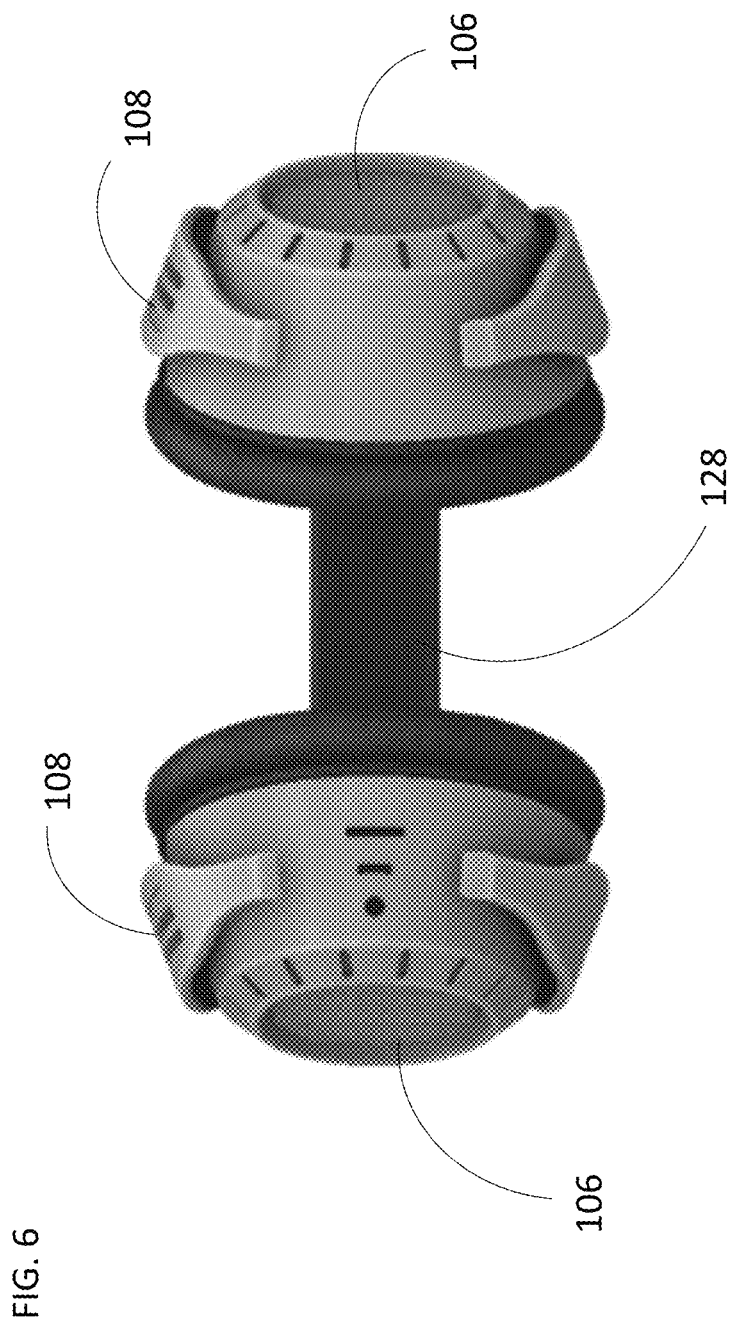
FIG. 6 shows a bottom view of an embodiment of an integrated headset communications system.

FIG. 6 presents a bottom view of the system 100. The system 100 can include a plurality of proximity sensors 128.

Figure 7:
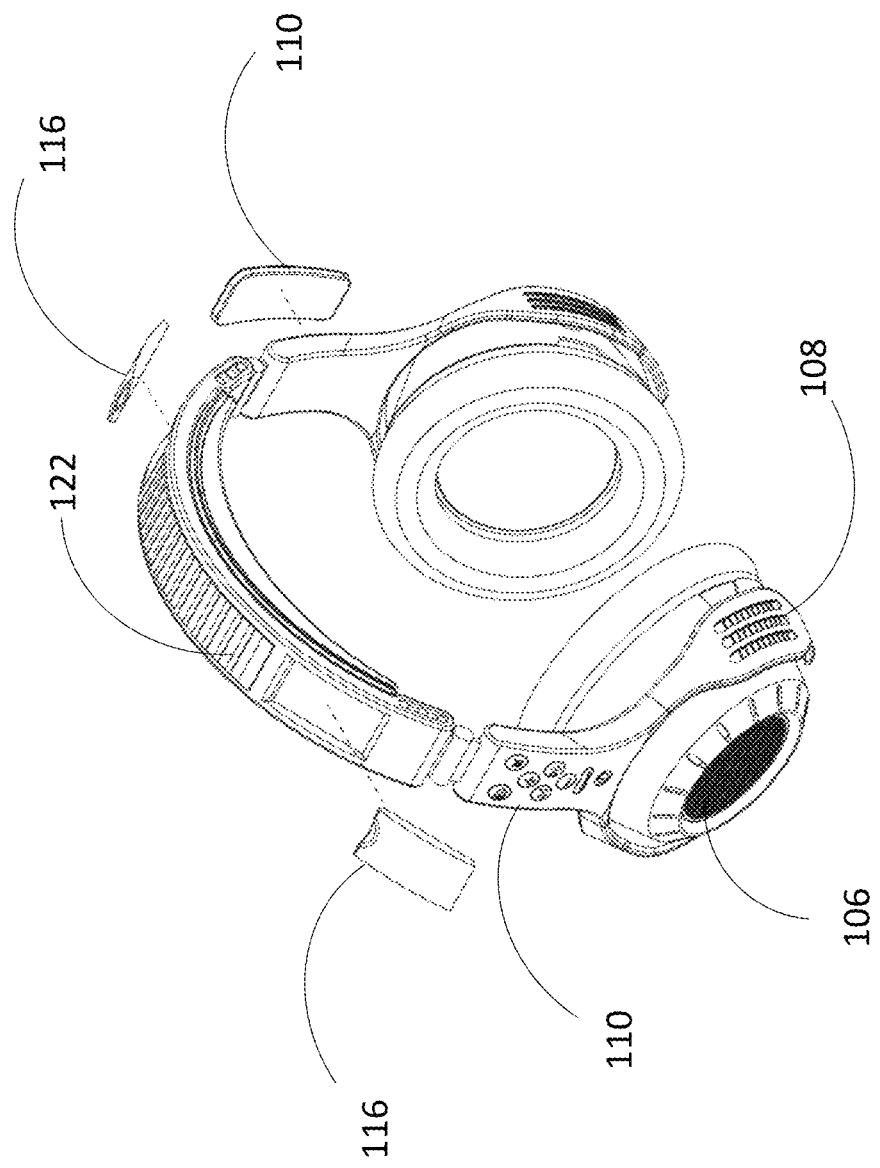
FIG. 7 shows an embodiment of the present invention showing removable battery packs.

FIG. 7 is an exploded view of the system 100. The system can include a plurality of communications devices and photocells 122 to utilize Bluetooth, wireless, GPS location information, and cell phone interface. The system can include removable battery packs 116, and a removable remote controller 110

In an embodiment of the invention, the system is configured to customize individualized acoustic and visual settings for individuals. The customization can occur on the headset itself, on the remote controller, and/or on computing devices such as laptops and mobile devices. Also, the system can include mobile applications.

In embodiments, the mobile applications can be configured to customize settings with data in accordance with algorithms derived from interaction with the individual. The mobile applications can be structured to allow system interface amongst all users of the system.

In some embodiments, the systems and/or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of implementation which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized the scope of this invention is much broader than presented by the claims. It is intended that broader claims will be submitted in an application that claims the benefit of priority from this application.

What is claimed is:

1. An integrated headset communications system comprising:
    a curved headband;
    a left-hand side headphone connected to an end of the curved headband with a swivelable and foldable pivot point;
    a right-hand side headphone connected to another end of the curved headband with another swivelable and foldable pivot point;
    external speakers on right-hand side and left-hand side headphones;
    internal speakers on right-hand side and left-hand side headphones;
    two detachable rechargeable battery packs positioned externally on a left-hand side and right-hand side lower portions of the curved headband and configured to power the system on one battery pack while the other battery pack has depleted or is detached from the system;
    a background noise cancellation mechanism attached to the system;
    a plurality of proximity sensors positioned on the system and configured to detect when the headset communications system is placed onto a user's ears and when the system is removed from the user's ears;
    an automatic volume control safety module configured to automatically modulate the internal speakers' volume when the plurality of proximity sensors detect the system is placed onto the user's ears and designed to prevent excessive volume of the internal speakers when the system is placed on the user's ears and structured to provide a safety mechanism to prevent inadvertent damage to the user's ears and arranged to prevent chronic hearing loss to system users;
    a plurality of photocells positioned externally on the curved headband;
    a plurality of flashlights and flashing lights positioned externally on the curved headband and externally on the left-hand side and right-hand side headphones and configured to automatically illuminate when the plurality of photocells detect low visibility or onset of darkness conditions;
    a data processor; and
    a removable system remote controller.

2. The system as recited in claim 1 further comprising an on and off control mechanism configured to turn the background noise cancellation mechanism on or off.

3. The system as recited in claim 1 further comprising an on and off mechanism configured to turn the automatic volume control safety module on or off.

4. The system as recited in claim 1 further comprising an on and off mechanism configured to turn the plurality of flashlights and flashing lights on or off.

5. The system as recited in claim 1 further comprising a system alert which annunciates when the battery pack's remaining charge is below 10% and is due to be removed and externally recharged.

6. The system as recited in claim 1 further comprising biometric sensors positioned on an interior of the curved headband and configured to provide a system user real time biometric data such as heart rate.

7. The system as recited in claim 1 further comprising photoluminescent strips positioned on external portions of the curved headband and the right-hand side and left-hand side headphones.

8. The system as recited in claim 1 further comprising reflective strips positioned on external portions of the curved headband and the right-hand side and left-hand side headphones.

9. The system as recited in claim 1 further comprising a wireless data receiver and transmitter.

10. The system as recited in claim 1 further comprising a GPS location identification device.

11. The system as recited in claim 10 further comprising a transmitting module capable of transmitting biometric and medical data to local emergency medical services upon an indication of a medical emergency wherein the medical data includes pre-existing medical conditions.

12. The system as recited in claim 1 further comprising a visual visor.

13. The system as recited in claim 1 wherein the remote controller includes a snap-on/snap-off attachment mechanism.

14. The system as recited in claim 1 further comprising solar panels positioned externally on the curved headband.

15. The system as recited in claim 1 further comprising Bluetooth communications capability configured such that the system can communicate and share data and music with another system when they are in proximity to each other.

\* \* \* \* \*